United States Patent Office 2,734,381
Patented Feb. 14, 1956

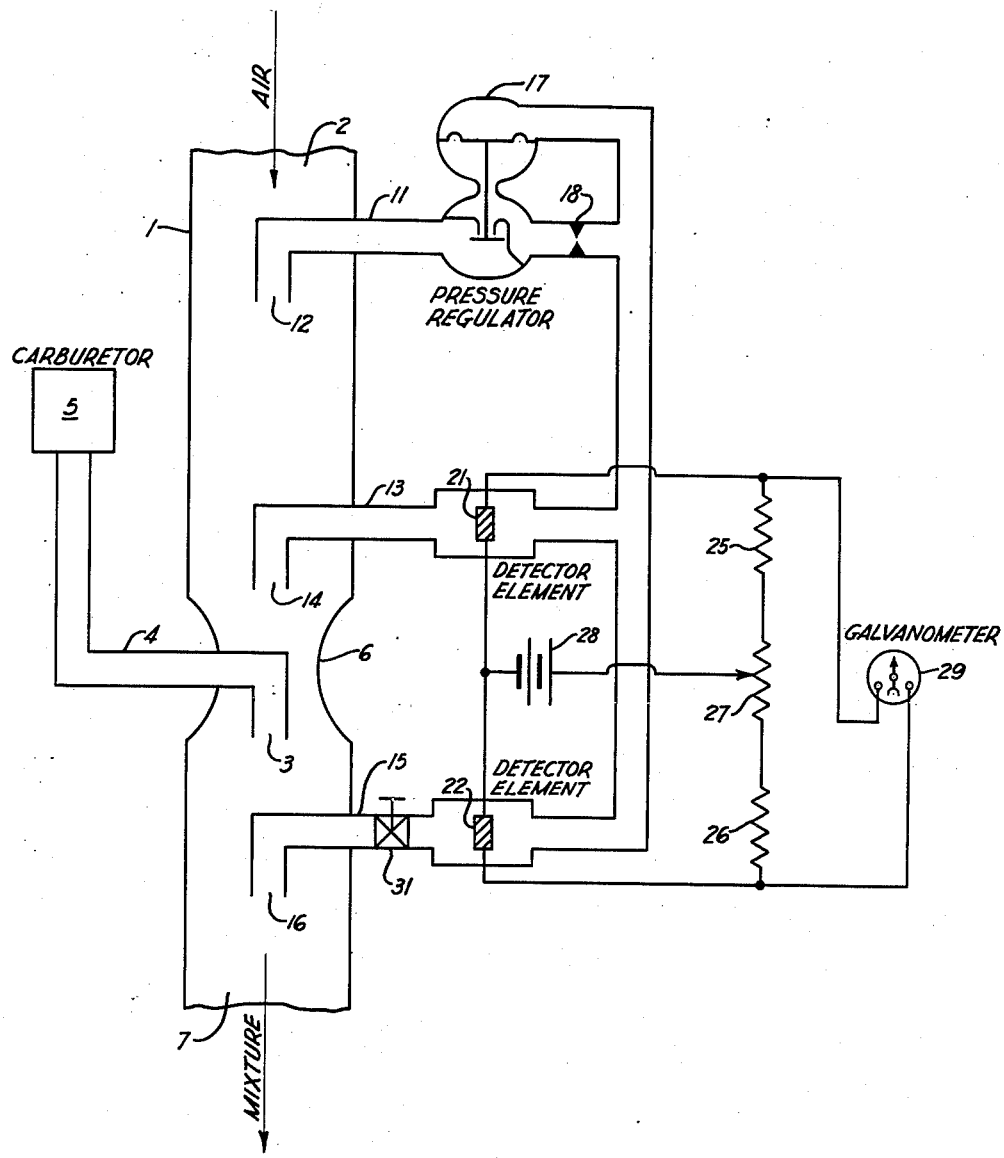

2,734,381

APPARATUS FOR MEASURING COMPONENT RATIOS OF FLUID MIXTURE STREAMS

Moses G. Jacobson, Penn Township, Allegheny County, Pa., assignor to Mine Safety Appliances Company, Pittsburgh, Pa., a corporation of Pennsylvania Application April 9, 1953, Serial No. 347,809

7 Claims. (Cl. 73—196)

The general object of this invention is to provide an apparatus for measuring the mass ratios between two fluid streams of different mass that are combined to form a mixture stream and, more specifically, for continuously measuring the fuel-air ratios of combustible mixtures supplied to internal combustion engines.

This invention is based in part on the observation that a change in the specific gravity or mass of a fluid flowing in a conduit changes its flow resistance, which in turn alters the static pressure differential between upstream and downstream points in the fluid stream. Accordingly, if a first fluid stream is flowing through a conduit and there is added to that stream at an intermediate point of the conduit a second fluid stream having a different mass, so that the two streams combine to form a mixture stream that flows through a portion of the conduit, then changes in the ratio in which the two fluid streams are combined will be reflected in changes in the static pressure differential between a point in the first fluid stream and a point in the mixture stream. However, the static pressure differential between two such points alone will not give an accurate indication of the ratio in which the two fluid streams are combined if the absolute pressure and velocity of the fluid streams vary over a substantial range, as, for example, in fuel-air mixtures supplied to internal combustion engines over the range from idling to maximum engine speed. Under such conditions, to which the present invention is particularly applicable, the mass ratios between the two fluids may be determined by comparing, through means to be described, (a) the pressure differential between a first and second point in the first fluid stream with (b) the pressure differential between one of those points and a third point in the mixture stream.

The apparatus for carrying out this invention includes a conduit having an inlet at one end for receiving a first fluid stream and having an outlet at the other end for discharging a mixture stream. At an intermediate point in the conduit, a second inlet is provided for introducing a second fluid stream of different mass and for intermixing it with the first fluid stream to form the mixture stream. For measuring the static pressure differentials in the conduit, three flow tubes are mounted with one end of each tube, here designated as its stream terminal, inside the conduit at points of progressively diminishing static pressures. The first and second tubes have their stream terminals in the first fluid stream, and the third tube has its stream terminal in the mixture stream. The other ends of each of those tubes are interconnected to provide a fluid passage from the stream terminal of the first tube to the stream terminals of each of the second and third tubes. Since the static pressure of the fluid adjacent the stream terminal of the first tube is higher than the static pressure of the fluid adjacent the stream terminals of both the second and third tubes, some of the first fluid alone will flow from the conduit through the first tube and then through each of the second and third tubes back into the conduit. The ratio of the static pressure differentials (a) between the stream terminals of the first and second tubes and (b) between the stream terminals of one of those tubes and the third tube may be measured by the ratio between the fluid flow through one of the tubes having its flow terminal in the first fluid stream and the fluid flow through the third tube. To measure those flow ratios, a detector element that is responsive to the mass flow of fluid is mounted in either the first or second tube and a similar detector element is mounted in the third tube, and indicating means are provided to compare the ratios of or differences in the responses of the two detector elements, whereby changes in the mass composition of the mixture (i. e., in the weight concentration of the component fluids), will be indicated and measured.

A preferred embodiment of this invention, as applied to the measurement of fuel-air ratios in the combustible mixture supplied to an internal combustion engine, is diagrammatically shown in the accompanying drawing.

A conduit 1 has an inlet 2 at its upper end for receiving a stream of air under pressure, as, for example, from a turbo-compressor (not shown). A second inlet 3 in the conduit, downstream from the first inlet 2, permits the introduction of wholly or partially vaporized fuel through a pipe 4 from a carburetor 5. Adjacent this second inlet, the conduit may have a restricted passage 6 to create a suction or Venturi effect for induction of the fuel and for intermixing it with the air stream. The conduit has an outlet 7 at its other end, which communicates with the inlet manifold of an internal combustion engine (not shown).

A first flow tube 11 is mounted with its stream terminal 12 inside the conduit in the air stream at a point upstream from the second inlet 3, i. e., in a region of high static pressure in the conduit. Further downstream, but still upstream from the second inlet, which is the point of introduction of the fuel from the carburetor, is mounted a second flow tube 13 with its stream terminal 14 also in the air stream. A third tube 15 has its stream terminal 16 inside the conduit at a point in the mixture stream that is downstream from the second inlet, i. e., downstream from the point of introduction of the fuel. The stream terminals of all the tubes are positioned to give effect to the static pressure of the adjacent fluid and to avoid the effects of velocity pressure. For example, the stream terminals may face downstream, as shown in the drawing, or they may be in the wall of the conduit itself or otherwise positioned to obtain the desired effect. The other ends of the three flow tubes are interconnected as shown to provide a fluid passage from the first tube to each of the other tubes.

The first flow tube 11 has associated with it a pressure regulator 17 of conventional type for maintaining a constant pressure differential across an orifice 18, and thereby a constant flow in the tube beyond that orifice. Associated with the second flow tube 13 (as, for example, mounted in an enlargement of the tube) is a detector element 21 responsive to the mass flow of fluid through that tube. A similar detector element 22 is associated with the third flow tube 15 for the same purpose. Those detector elements may be of various types, but are preferably of the hot body mass-flow type that includes an electrical resistor adapted to be heated to a high temperature and the resistance or impedance of which is functionally variable with the fluid flow in contact with it. In order to compare the responses of two such detector elements, they are connected in a Wheatstone bridge circuit, which also includes fixed resistors 25 and 26, a variable resistor 27, a source of current 28, and a galvanometer 29.

In operating this apparatus, air alone is first passed through conduit 1, and the resulting air flow through each of the second and third flow tubes is manually equalized by adjusting a needle valve 31 in the third flow tube until the same current is passing through each of detector elements 21 and 22, as indicated by a null reading of the galvanometer 29.

When fuel is admitted to the conduit from the carburetor 5 and intermixed with the air in the conduit, the resulting mixture will have a higher specific gravity than the air, so that there will be more frictional resistance to the flow of the mixture through the conduit than to the flow of air alone. Accordingly, the static pressure in the mixture stream adjacent the stream terminal of the third flow tube will be less after the admixture of fuel than when air alone was passing through that portion of the conduit; and more air will now flow through the third flow tube than through the second. Detector element 22 will accordingly be cooled more than detector element 21, the increased cooling effect being shown by the degree of unbalance in the bridge circuit, as indicated either by the deflection of the galvanometer 29 or, alternatively, by the amount of adjustment required in the variable resistance 27 to rebalance the bridge circuit. The richer the mixture, due to the addition of more fuel, the greater will be the pressure drop in the fluid adjacent the stream terminal of the third flow tube and the greater will be the cooling effect on its associated detector element.

As the engine speed varies, for any given fuel-air ratio there will be more or less air, as well as more or less fuel, flowing through conduit 1, with resulting changes in the absolute static pressures and velocities of the fluid in the conduit. However, the ratio of the static pressure differential between the stream terminals of (1) the first and second tubes and (2) the first and third tubes will remain substantially unchanged, i. e., $$\frac{P1-P2}{P1-P3}$$

will remain substantially constant, where P1 and P2 are the static pressures of the air stream adjacent the stream terminals of the first and second tubes, respectively; and P3 is the static pressure of the mixture stream adjacent the stream terminal of the third tube. Under the same conditions, i. e., where the fuel-air ratio remains constant but the engine speed varies, the ratio between the air flow ($v_2$) over detector element 21 and the air flow ($v_3$) over detector element 22 will remain substantially constant for variations in engine speed as high as 40:1. In fact, that ratio will remain substantially constant even without the pressure regulator 17 and the associated orifice 18 for variations in engine speed as high as 10:1. Thus the calibration of the instrument is substantially independent of changes in the absolute pressures and velocities of the air and mixture streams for practically all variations in engine speed that are usually encountered.

When the fuel-air ratio varies, mathematical analysis developed by the applicant and based on fundamental relationships for turbulent flow in pipes (see e. g., Ower, "Measurement of Air Flow," Chapman and Hall, 3rd ed. 1949, pp. 127–129) shows that between the flows over the two detector elements $v_2$ and $v_3$, and the weight concentration ($w$) of the mixture, the following relationship is in effect:

$$\left(\frac{v_3}{v_2}\right)^{2-q}=k\left(1+\frac{m}{n}w\right)$$

where $k$ is a constant, which can be made equal to unity by adjusting $v_2$ and $v_3$ to equality in the absence of fuel; $q$ is a small quantity not over 0.3; and $m/n$ is a fraction of the order 8/10 to 9/10; $q$ and $m/n$ remain constant for a given conduit shape and size. Accordingly, the deflection of the galvanometer 29, or other equivalent indicator, being a definite function of $v_3/v_2$ that is not far from proportionality, will be a single valued function of the fuel-air ratio of the mixture stream by mass or, its practical equivalent, by weight, and that function is independent of the composition of the fuel or the thermal characteristics of the components of the mixture.

Another advantage of this invention is that air alone comes in contact with the detector elements 21 and 22, the responses of which are therefore not distorted by the presence of combustible constituents, especially when the latter are not fully vaporized. This feature of the invention permits the detector elements to be operated at high temperatures, using wire resistance elements without fear of combustion occurring, and greatly reduces the time lag of their reaction and the effect of the ambient temperature thereon. Even more important, this feature prevents any corrosive action by the combustible constituents on the resistance elements and thus greatly prolongs their useful life and avoids constant recalibration.

While this invention has been described in connection with the determination of fuel-air ratios in combustible mixtures for use in internal combustion engines, it will be apparent that the invention is equally adapted to be used in measuring the mass ratios of other fluids, both gaseous and liquid that are combined to form fluid mixtures.

According to the provisions of the Patent Statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. Apparatus for continuously measuring the mass ratio of two fluid streams of different mass that are combined to form a mixture stream, that apparatus comprising a conduit having a first inlet at one end for receiving the first fluid stream and having a second inlet at an intermediate point for receiving the second fluid stream and having an outlet at the other end for discharging the mixture stream, three flow tubes each provided with a stream terminal at one end and each mounted to have that terminal within the conduit at points of successively diminishing static pressure, the terminals of the first and second tubes being positioned in the first fluid stream between the first and second inlets with the terminal of the second tube spaced downstream from the terminal of the first tube, the terminal of the third tube being positioned in the mixture stream between the second inlet and the outlet, the other end of the first tube being connected to the other end of the second tube and also to the other end of the third tube, a separate detector means positioned in each of the second and third flow tubes and responsive to the flow of fluid therein, valve means positioned in the third flow tube for manually equalizing the flow of fluid therein with the flow of fluid in the second flow tube when the first fluid stream alone is flowing in the conduit, and indicating means for comparing the responses of the detector means.

2. Apparatus according to claim 1, in which each of the detector means includes an electrically heated resistance element.

3. Apparatus according to claim 1, in which each of the detector means includes an electrically heated resistance element and in which the indicating means includes a Wheatstone bridge circuit having both of the resistance elements connected therein, and means for measuring the unbalance of the circuit.

4. Apparatus according to claim 1, in which a regulating means is associated with the first flow tube to provide a substantially constant flow of fluid in that tube regardless of the variations in the absolute pressure and flow of the fluids within the conduit.

5. Apparatus according to claim 4, in which the regulating means includes an orifice and a pressure regulator for maintaining a constant pressure differential across that orifice.

6. Apparatus for continuously measuring the mass ratio of fuel and air that are combined to form a combustible mixture supplied to an internal combustion engine, that apparatus comprising a conduit having a first inlet at one end for receiving the air and having a second inlet at an intermediate point for receiving the fuel and having an outlet at the other end for discharging the combustible mixture, three flow tubes each provided with a stream terminal at one end and each mounted to have that terminal within the conduit at points of successively diminishing static pressure, the terminals of the first and second tubes being positioned in the air stream between the first and second inlets with the terminal of the second tube spaced downstream from the terminal of the first tube, the terminal of the third tube being positioned in the mixture stream between the second inlet and the outlet, the other end of the first tube being connected to the other end of the second tube and also to the other end of the third tube, regulating means positioned in the first tube for maintaining a substantially constant flow of air therein, a separate detector means comprising an electrically heated resistance element positioned in each of the second and third tubes and responsive to the mass flow of air therein, indicating means comprising a Wheatstone bridge circuit including the detector means for measuring the responses of the latter, and an adjusting valve in the third tube for equalizing the air flow through the second and third tubes when air alone is flowing through the conduit.

7. Apparatus for continuously measuring the mass ratio of two fluid streams of different mass that are combined to form a mixture stream, that apparatus comprising a conduit having a first inlet at one end for receiving the first fluid stream and having a second inlet at an intermediate point for receiving the second fluid stream and having an outlet at the other end for discharging the mixture stream, three flow tubes each provided with a stream terminal at one end and each mounted to have that terminal within the conduit at points of successively diminishing static pressure, the terminals of the first and second tubes being positioned in the first fluid stream between the first and second inlets with the terminal of the second tube spaced downstream from the terminal of the first tube, the terminal of the third tube being positioned in the mixture stream between the second inlet and the outlet, the other end of the first tube being connected to the other end of the second tube and also to the other end of the third tube, a separate detector means positioned in each of the second and third tubes and responsive to the flow of fluid therein, and indicating means for comparing the repsonses of the detector means, comprising a Wheatstone bridge circuit including both detector means and also including a variable resistor for balancing the bridge circuit when the first fluid stream alone is passed through the conduit.

References Cited in the file of this patent

UNITED STATES PATENTS

| 1,803,260 | Kondo | Apr. 28, 1931 |

FOREIGN PATENTS

| 544,331 | Germany | Feb. 16, 1932 |